United States Patent
Kajino

(10) Patent No.: US 7,609,371 B2
(45) Date of Patent: Oct. 27, 2009

(54) LENS METER

(75) Inventor: Tadashi Kajino, Okazaki (JP)

(73) Assignee: Nidek Co., Ltd., Gamagori (JP)

( * ) Notice: Subject to any disclaimer, the term of this patent is extended or adjusted under 35 U.S.C. 154(b) by 0 days.

(21) Appl. No.: 11/992,419

(22) PCT Filed: Nov. 2, 2005

(86) PCT No.: PCT/JP2005/020207

§ 371 (c)(1),
(2), (4) Date: Mar. 21, 2008

(87) PCT Pub. No.: WO2007/052347

PCT Pub. Date: May 10, 2007

(65) Prior Publication Data

US 2009/0021725 A1    Jan. 22, 2009

(51) Int. Cl.
*G01M 11/02* (2006.01)
(52) U.S. Cl. .................. 356/124; 356/125; 356/127
(58) Field of Classification Search .......... 356/124–127
See application file for complete search history.

(56) References Cited

U.S. PATENT DOCUMENTS

| | | | |
|---|---|---|---|
| 3,880,525 A | | 4/1975 | Johnson |
| 5,379,111 A * | | 1/1995 | Kajino et al. ............... 356/124 |
| 5,414,505 A * | | 5/1995 | Ikezawa et al. ............. 356/127 |
| 5,682,234 A * | | 10/1997 | Kajino ....................... 356/124 |
| 5,734,465 A * | | 3/1998 | Kajino ....................... 356/124 |
| 5,971,537 A * | | 10/1999 | Fukuma et al. .............. 351/44 |
| 6,061,123 A * | | 5/2000 | Ikezawa et al. ............. 356/124 |
| 6,657,710 B2 * | | 12/2003 | Kajino et al. ............... 356/124 |
| 6,972,837 B2 * | | 12/2005 | Kajino ....................... 356/124 |
| 2005/0179863 A1 | | 8/2005 | Taguchi et al. |

FOREIGN PATENT DOCUMENTS

| | | |
|---|---|---|
| EP | 0 363 281 A2 | 4/1990 |
| JP | A 50-145249 | 11/1975 |
| JP | A 2-210238 | 8/1990 |
| JP | A 2003-75296 | 3/2003 |
| WO | WO 03/098181 A1 | 11/2003 |

* cited by examiner

*Primary Examiner*—Sang Nguyen
(74) *Attorney, Agent, or Firm*—Oliff & Berridge, PLC

(57) ABSTRACT

A lens meter for measuring optical characteristics of a lens to be measured includes a measurement optical system including a light source which projects a measurement light beam to the lens and a light receiving sensor which receives the measurement light beam having passed through the lens; an arithmetic part which obtains optical characteristic distribution of a predetermined measurement region of the lens based on a light reception result of the light receiving sensor; near-vision-portion determination means which determines whether a near vision portion of the lens is present in the measurement region based on the optical characteristic distribution in the measurement region; and detection means which detects presence of a non-optical region in addition to an optical region of the lens in the measurement region based on the light reception result of the light receiving sensor; the arithmetic part obtains additional power of the lens based on the optical characteristic distribution of the optical region in the measurement region when the near-vision-portion determination means does not determine the presence of the near vision portion in the measurement region and the detection means detects the presence of the non-optical region in the measurement region.

4 Claims, 6 Drawing Sheets

LOWER PART OF SPECTACLES (LENS)

200

20p

UPPER PART OF SPECTACLES (LENS)

LENS METER

TECHNICAL FIELD

The present invention relates to a lens meter for measuring optical characteristics of a lens.

BACKGROUND ART

There is a lens meter arranged to project a measurement light beam to a target lens to be measured, which is placed on a measurement optical axis, receive the measurement light beam having passed through the target lens by a light receiving sensor, and obtain optical characteristics of the target lens such as refractive power based on a light reception result of the sensor. There has also been proposed a lens meter arranged to obtain the optical characteristics at each of a plurality of measurement positions (measurement points) in a predetermined measurement region of the target lens, that is, optical characteristic distribution in the measurement region. Such a lens meter makes it easy to measure a near vision portion of a progressive lens based on the optical characteristic distribution in the measurement region.

Recently, fashionability of spectacles is regarded as important. A so-called "half-eye lens" narrow in vertical width is increasing. However, when the progressive lens is processed into the "half-eye lens", part of the near vision portion may be lacking. In this case, a conventional lens meter could not make an accurate measurement or the like of the near vision portion.

DISCLOSURE OF INVENTION

Problems to be Solved by the Invention

The present invention has been made under the conventional problems and has a purpose to provide a lens meter capable of accurately and easily making measurement of a near vision portion or the like even where the near vision portion of a progressive lens is lacking in such a case where the progressive lens is processed into a "half-eye lens".

Means for Solving the Problems

To achieve the above purpose, the present invention is characterized in the following configurations.

(1) A lens meter for measuring optical characteristics of a lens to be measured, comprises: a measurement optical system including a light source which projects a measurement light beam to the lens and a light receiving sensor which receives the measurement light beam having passed through the lens; an arithmetic part which obtains the optical characteristic distribution of a predetermined measurement region of the lens based on a light reception result of the light receiving sensor; near-vision-portion determination means which determines whether a near vision portion of the lens is present in the measurement region based on the optical characteristic distribution in the measurement region; and detection means which detects presence of a non-optical region in addition to an optical region of the lens in the measurement region based on the light reception result of the light receiving sensor; the arithmetic part obtains additional power of the lens based on the optical characteristic distribution of the optical region in the measurement region when the near-vision-portion determination means does not determine the presence of the near vision portion in the measurement region and the detection means detects the presence of the non-optical region in the measurement region.

(2) The lens meter of (1) is characterized by further comprising a display part which displays, in a distinguishable manner, additional power obtained when the near-vision-portion determination means does not determine the presence of the near vision portion in the measurement region and the detection means detects the presence of the non-optical region in the measurement region and additional power obtained when the near-vision-portion determination means determines the presence of the near vision portion in the measurement region.

(3) The lens meter of (1) is characterized in that the arithmetic part obtains a predicted value of additional power of the near vision portion based on the optical characteristic distribution of the optical region in the measurement region when the near-vision-portion determination means does not determine the presence of the near vision portion in the measurement region and the detection means detects the presence of the non-optical region in the measurement region.

(4) The lens meter of (1) is characterized by further comprising far-vision-portion determination means which determines whether a far vision portion of the lens is present in the measurement region based on the optical characteristic distribution in the measurement region, and wherein the arithmetic part obtains far power of the lens based on the optical characteristic distribution of the optical region in the measurement region when the far-vision-portion determination means does not determine the presence of the far vision portion in the measurement region and the detection means detects the presence of the non-optical region in the measurement region.

ADVANTAGES OF THE INVENTION

According to the lens meter of the present invention, it is possible to accurately and easily make measurement of a near vision portion or the like even where the near vision portion of a progressive lens is lacking in the case where the progressive lens is processed into a "half-eye lens" or other cases.

EXPLANATION OF REFERENCE CODES

Figure 1:
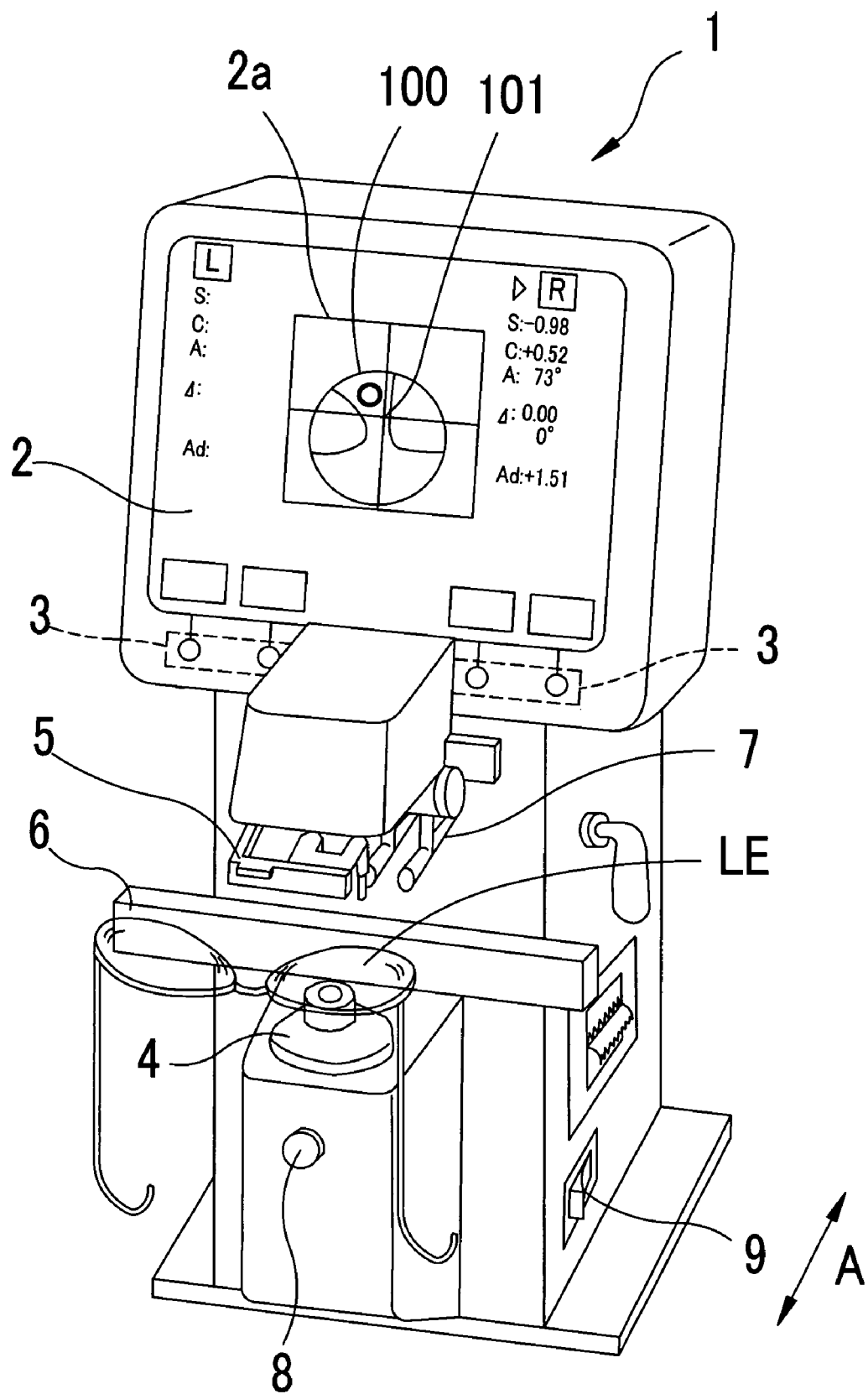
FIG. 1 is a schematic external view of a lens meter of the present invention.

1 Main body of Lens meter
2 Display
3 Switch
4 Nosepiece
5 Lens retainer
6 Frame rest
7 Marking mechanism
8 READ switch
9 Power switch
10 Measurement optical system
11 Light source for measurement
12 Collimating lens
13 Mirror
14 Target plate
15 Two-dimensional light receiving sensor
16 Holder
20 Target
21 Center target
22 Target
40 Arithmetic control part
42 Memory
100 Progressive lens mark
101 Cross target mark
110 Far-vision portion guide mark
120 Near-vision portion guide mark
125 Bold cross mark
130 Measured-value indicating section
131 Identifying mark

BEST MODE FOR CARRYING OUT THE INVENTION

A preferred embodiment of the present invention will be described referring to the drawings. FIG. 1 is a schematic external view of a lens meter in the embodiment of the present invention.

On a display 2 such as a liquid crystal display provided in an upper part of a main body 1 of the lens meter, information necessary for measurement, measurement results, and others are displayed. Further, with the press of a switch 3 corresponding to a switch display appearing on the display 2, a necessary command such as measurement mode switching and the like is input. A target lens LE to be measured is mounted on a nosepiece (a lens table) 4. A lens retainer 5 is moved down (toward the nosepiece 4) to stably hold the lens LE on the nosepiece 4.

When the lens LE set in a spectacle frame is to be measured, a frame rest (a lens rest) 6 movable backward and forward (in a direction indicated by an arrow A) is brought into contact with lower edges (lower edges in a spectacle wearing state) of right and left lens frames (or right and left lenses) for stable support. Consequently, a cylindrical axis angle of the lens LE can be measured accurately.

A marking mechanism 7 is used for applying a mark onto the lens LE. A READ switch 8 is a switch for transmitting a command signal for storing measurement results (optical characteristics data) of the lens LE. Upon pressure of the switch 8, the measurement results are displayed on the display 2 and simultaneously stored in a memory 42 of the main body 1. A power switch 9 is a switch for turning on the power of the apparatus.

Figure 2:
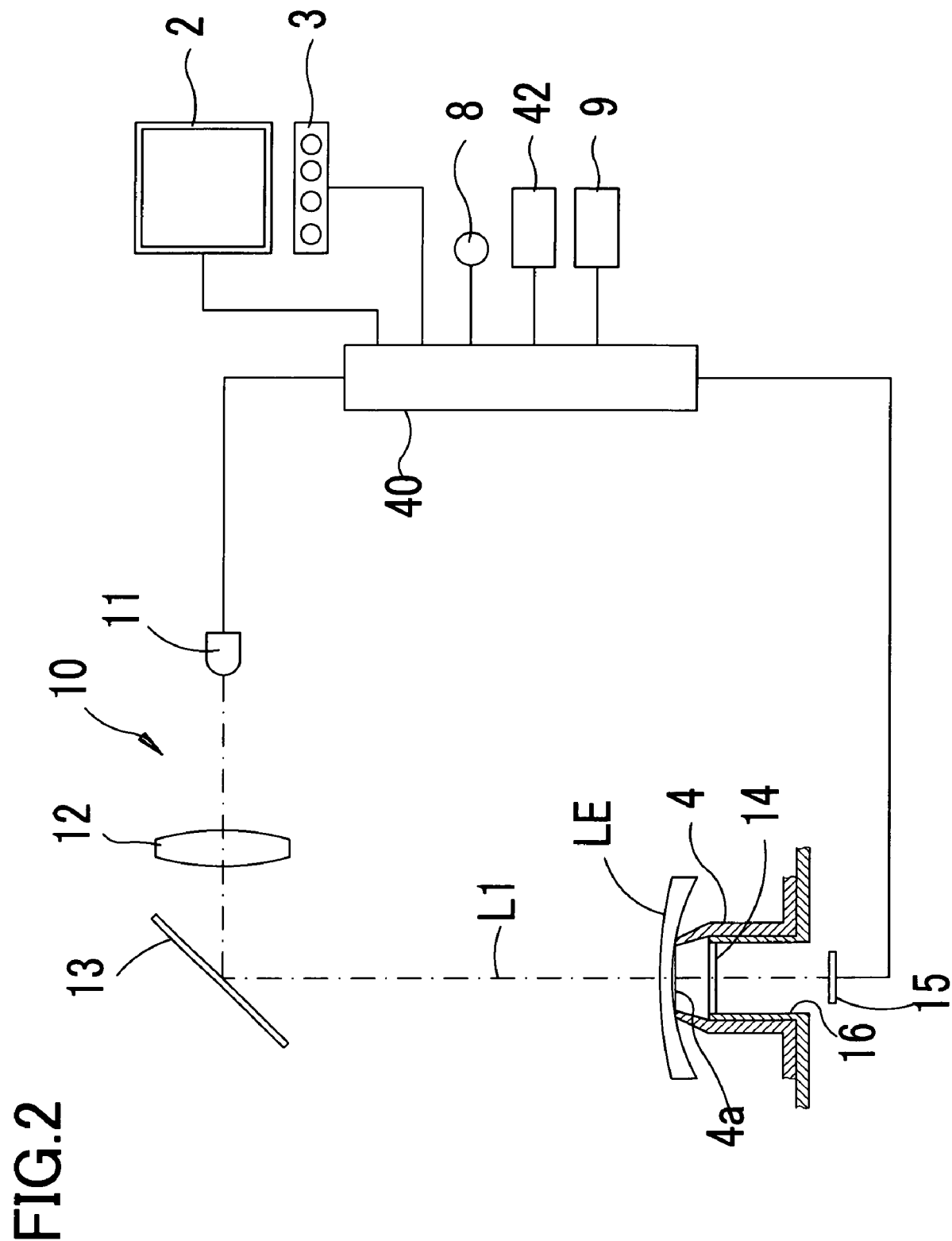
FIG. 2 is a schematic configuration view of an optical system and a control system of the lens meter.

FIG. 2 is a schematic configuration view of an optical system and a control system of the present apparatus (lens meter). Numeral 10 denotes a measurement optical system and L1 is its measurement optical axis. The measurement optical system 10 includes a light source 11 for measurement such as an LED, a collimating lens 12, a mirror 13, a target plate 14 formed with measurement targets, and a two-dimensional light receiving sensor (an image sensor) 15 such as a CCD, and each element is disposed on the optical axis L1. The optical axis L1 passes through the center of an opening 4a of the nosepiece 4 and is perpendicular to an opening plane of the opening 4a. The target plate 14 is retained in a holding member 16 of the main body 1 and located just under and close to the opening 4a. The opening 4a has a circular shape of about 8 mm in diameter. The target plate 14 may be placed in front of the lens LE (on the side closer to the light source 11) instead of being placed in back of the lens LE (on the side closer to the light receiving sensor 15).

Figure 3:
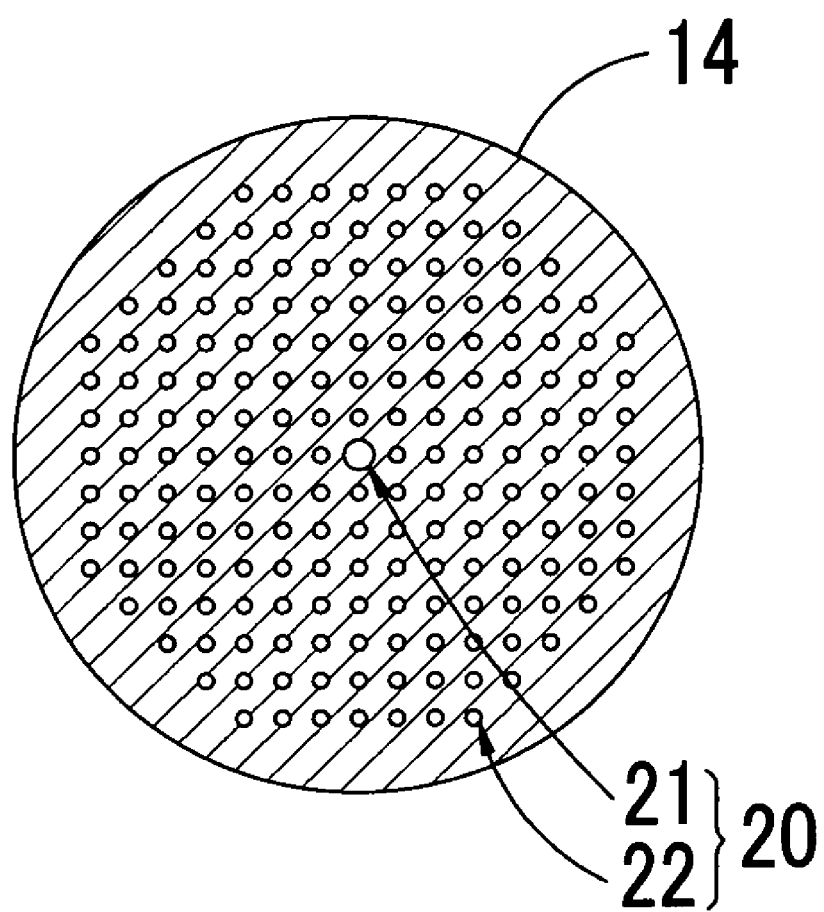
FIG. 3 is a diagram showing an arrangement (distribution) pattern of targets formed on a target plate.

FIG. 3 is a drawing showing an arrangement (distribution) pattern of the targets formed on the target plate 14. The target plate 14 is of a circular shape having an outer diameter slightly larger than an inner diameter of the opening 4a and is formed with a number of targets 20. The targets 20 in the present embodiment include a center target 21 located at the center through which the optical axis L1 passes, the center target 21 being a large circular hole of about 0.4 mm in diameter, and peripheral targets 22 located around the center target 21 in a grid pattern with about 0.5-mm pitches, each peripheral target 22 being a small circular hole of about 0.2 mm in diameter. The number of targets 22 is about 200, which are arranged within an area of about 7 mm in diameter centered about the optical axis L1. It is to be noted that the targets 20 may be formed by providing black Cr coating with voids as the target 21 and the targets 22 on a back surface of the target plate 14.

An image of the target 21 is used as an image of a reference target for specifying a correlation between images of the targets 22, that is, used as an image of a reference target for specifying the images of the targets 22 in a measurement state where the lens LE is placed on the optical axis L1 with respect to the images of the targets 22 with a "0 D (diopter) reference" in a reference state where the lens LE is not placed on the optical axis L1. The reference target is not limited in number and shape if only it can be distinguished from other targets, e.g., it may be located in any position other than the center position of the target plate 14.

A measurement light beam from the light source 11 is formed into a collimated light beam by the collimating lens 12, is reflected by the mirror 13, and is projected onto the lens LE mounted on the nosepiece 4 to be placed on the optical axis L1. Of the measurement light beams having passed through the lens LE, a measurement light beam having passed through the opening 4a, the target (hole) 21 and the targets (holes) 22 of the target plate 14, enters the light receiving sensor 15.

An output signal from the light receiving sensor 15 is input to an arithmetic control part 40 which is connected to the memory 42. The arithmetic control part 40 obtains optical characteristics of the lens LE (spherical power, cylindrical power, a cylindrical axis angle, prism power) from a change in the position (coordinate) of each target image detected by the light receiving sensor 15 in the measurement state where the lens LE having refractive power is mounted on the nosepiece 4 to be placed on the optical axis L1, with respect to the position (coordinate) of each target image detected by the light receiving sensor 15 in the reference state where the lens LE is not mounted on the nosepiece 4 and not placed on the optical axis L1. For example, in a state where the lens LE having only the spherical power is placed on the optical axis L1, the positions of the target images will shift relative to the optical center of the lens LE so as to scale up or down a perfect circular pattern as compared with a state where the lens LE is not placed on the optical axis L1. Based on this scaling amount, the spherical power can be obtained. In a state where the lens LE having only the cylindrical power is placed on the optical axis L1, the positions of the target images will shift relative to the axial center of the lens LE so as to scale up or down an elliptic pattern as compared with a state where the lens LE is not placed on the optical axis L1. Based on this scaling amount, the cylindrical power and the cylindrical axis angle can be acquired. The prism power can be obtained based on the amount of translation of the position of the image of the target 21 or the image of each target 22 arranged around the target 21. The lens LE having the spherical power, the cylindrical power, and the prism power may be regarded as the complex of the above lenses (see U.S. Pat. No. 3,880,525 (JP-A-50(1975)-145249)).

The arithmetic control part 40 can obtain the optical characteristics of the lens LE from an average of changes in respective positions of the target images in each group by regarding four adjacent target images ("2×2" spots) (at least three) as one group, or "3×3" spots, "4×4" spots, "5×5" spots, or the like as one group. The measurement position (the measurement point) at that time is determined to be the position of the lens LE corresponding to the center position of each target image group or a specific target image position. According to the configuration of the present apparatus (lens meter), it is therefore possible to simultaneously obtain the optical characteristics at a plurality of measurement positions (measurement positions) within a measurement region of the lens LE corresponding to the opening 4a. In other words, the optical characteristic distribution within the measurement region can be obtained. Accordingly, as to a progressive lens, it is possible to efficiently determine whether or not at least one of current measurement positions is in a far vision portion (whether or not part of the far vision portion is in the current measurement region). Similarly, it is possible to efficiently determine whether or not at least one of current measurement positions is present in a near vision portion (whether or not part of the near vision portion is present in the current measurement region) and whether or not at least one of current measurement positions is present in a progressive portion (whether or not part of the progressive portion is present in the current measurement region).

The arithmetic control part 40 controls a display on the display 2 based on a result of detecting an alignment state of a desired position or region of the lens LE relative to the optical axis L1. The arithmetic control part 40 serially obtains the optical characteristic distribution in the measurement region at predetermined time intervals based on output signals from the light receiving sensor 15.

The lens meter having the above configuration will be explained with a focus on measurement operations for the progressive lens set in a spectacle frame. With the switch 3, a single focal lens measurement mode or a progressive lens measurement mode is selected, and which the lens LE is, a left eye lens or a right eye lens, is designated. The following explanation is made on a case where the progressive lens measurement mode is selected and the right eye lens is designated.

The optical characteristics shall be determined from changes in the positions of the target images in a group of "5×5" spots. The measurement position is regarded as the position of the lens LE corresponding to the center position of each target image group.

Figure 4A:
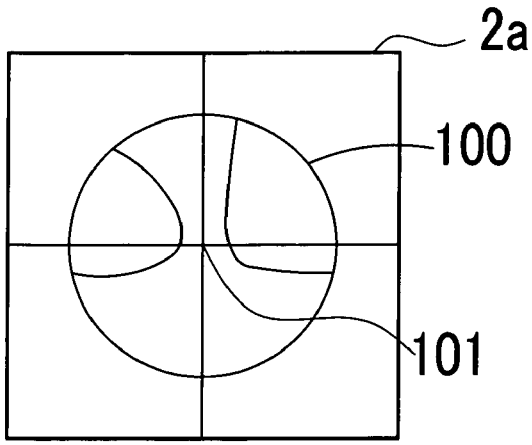
FIG. 4A is a diagram showing a display screen for alignment to bring a far vision portion of a progressive lens into a measurement region.

When the progressive lens measurement mode (additional power measurement mode) is selected with the switch 3, as shown in FIG. 4A, a progressive lens mark 100 simulating a progressive lens and a cross target mark 101 whose intersection represents the center position of a current measurement region, namely, the measurement position corresponding to the optical axis L1 are displayed on an alignment screen 2a of the display 2. The near vision portion of the progressive lens is located inward (on a nose side) by about 2 mm than the far vision portion. When the right eye lens is designated, accordingly, a portion of the mark 100 extending from the progressive portion to the near vision portion is displayed at a slight slant to the left. The mark 100 in the present embodiment is movably displayed in association with changes in an alignment state of the lens LE in association of movement thereof on the nosepiece 4, while the mark 101 is fixedly displayed in the center of the screen 2a. In the present apparatus, an upper part of the screen 2a corresponds to a back side of the apparatus and a lower part of the screen 2a corresponds to a front side of the apparatus. Further, the mark 100 may be a rim shape (a lens shape) of a spectacle frame, instead of the circular shape.

When the lens LE is put on the nosepiece 4, the arithmetic control part 40 determines on which part of the lens LE the measurement region (the measurement position) is present, based on the optical characteristic distribution in the measurement region. Specifically, when spherical equivalent power or spherical power differs (varies) between the measurement positions in the vertical direction of the lens LE, it is determined that the measurement region is in a nearly central part (a nearly central part of the progressive portion) of the lens LE. When additional power or cylindrical power does not differ (vary) between the measurement positions in the vertical and lateral directions of the lens LE and horizontal prism power in each measurement position is approximately zero, it is determined that the measurement region is substantially in the far vision portion. When the cylindrical power differs (varies) between the measurement positions in the lateral direction of the lens LE, it is determined that the measurement region is substantially on the right and left sides of the progressive portion.

Figure 4B:
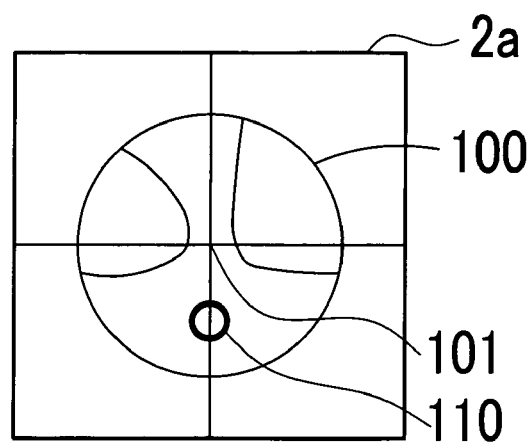
FIG. 4B is a diagram showing a display screen for alignment to bring the far vision portion of the progressive lens into the measurement region.
Figure 4C:
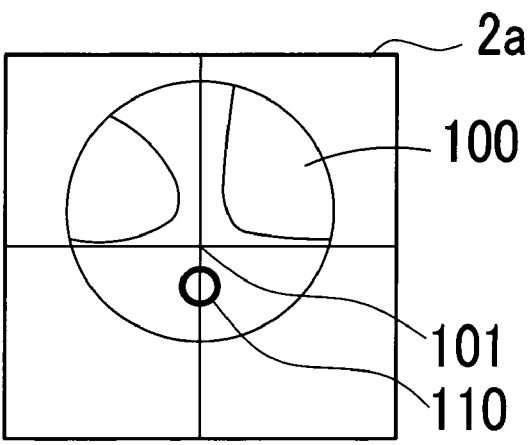
FIG. 4C is a diagram showing a display screen for alignment to bring the far vision portion of the progressive lens into the measurement region.

FIG. 4B shows an example of the screen 2a appearing when the measurement region is determined to be in the nearly central part of the lens LE when the lens LE is mounted on the nosepiece 4. When it is determined that the lens LE is mounted on the nosepiece 4, in a step of bringing the measurement region into the far vision portion, an annular guide mark 110 for far vision portion is first displayed within a region corresponding to the far vision portion in the mark 100 to have a correlation with display of the progressive portion. At this time, the arithmetic control part 40 stores distribution information of the spherical equivalent power or the spherical power, and the prism power in the memory 42. In the display state of FIG. 4B, when the lens LE is moved to the back side of the apparatus to cause the mark 110 to approach the mark 101, the mark 100 and mark 110 are moved (respective display positions change) upward on the screen 2a as shown in FIG. 4C relative to the mark 101 fixedly displayed in the center of the screen 2a. As the lens LE is moved, the prism power and the refractive power will vary. Thus, the arithmetic control part 40 calculates a moving distance from an initially stored position based on a Prentice's formula ["displacement distance (mm) from an optical center"="prism power (D)"/ "refractive power (D)"×10]. Based on the calculated moving distance, the mark 100 and the mark 110 are moved together (respective display positions are changed) as needed.

Figure 4D:
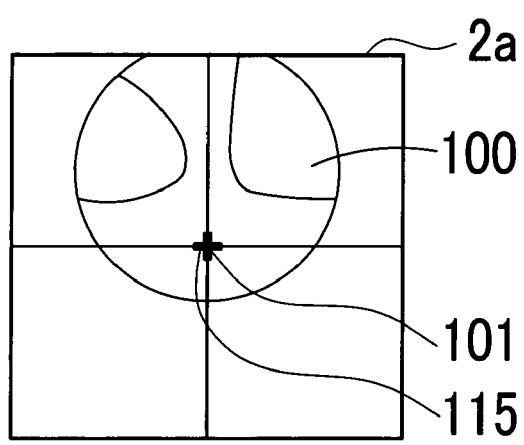
FIG. 4D is a diagram showing a display screen for alignment to bring the far vision portion of the progressive lens into the measurement region.

An examiner gradually moves the lens LE so that the mark 110 overlaps with the intersection of the mark 101 in order to align the far vision portion of the lens LE with the optical axis L1. Based on the variation in the spherical equivalent power or the spherical power, the arithmetic control part 40 determines that the measurement region is in the far vision portion when it enters a region with little or no additional power. The arithmetic control part 40 then changes the mark 110 to a bold cross mark 115 and causes this mark 115 to be displayed overlapping with the intersection of the mark 101 as shown in FIG. 4D. This informs of completion of the alignment of the far vision portion. A measured value of the far vision portion is stored in the memory 42 at the press of the switch 8 or automatically.

Figure 4E:
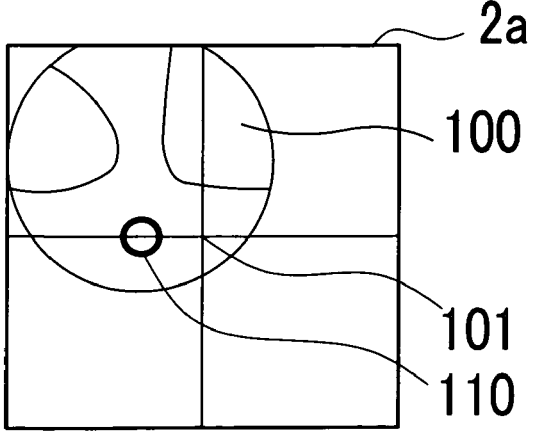
FIG. 4E is a diagram showing a display screen for alignment to bring the far vision portion of the progressive lens into the measurement region.

FIG. 4E is a display example of a case where the far vision portion is deviated in the lateral direction. The displacement in the lateral direction is judged based on a difference (variation) of the horizontal prism power. In this case, the lens LE has only to be moved rightward to cause the mark 110 to overlap with the intersection of the mark 101.

Figure 5A:
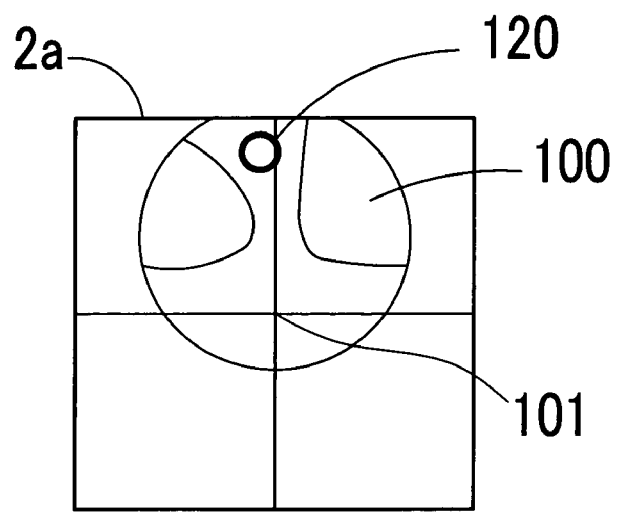
FIG. 5A is a diagram showing a display screen for alignment to bring a near vision portion of a progressive lens into a measurement region.

After the measured value of the far vision portion is stored in the memory 42, a step of measuring the near vision portion follows. As shown in FIG. 5A, the mark 115 is caused to disappear and another annular guide mark 120 for near vision portion is displayed within a region corresponding to the near vision portion of the mark 100 to have a correlation with display of the progressive portion. To measure the additional power this time, the lens LE is moved forward of the apparatus to cause the mark 120 to approach the mark 101. At this time, the arithmetic control part 40 calculates a moving distance from the far vision portion based on the prism power and the refractive power of the far vision portion stored in the memory 42. Then, the mark 120 and the mark 100 are displayed while moving toward the mark 101 (respective display positions are changed) based on the calculated moving distance.

Figure 5B:
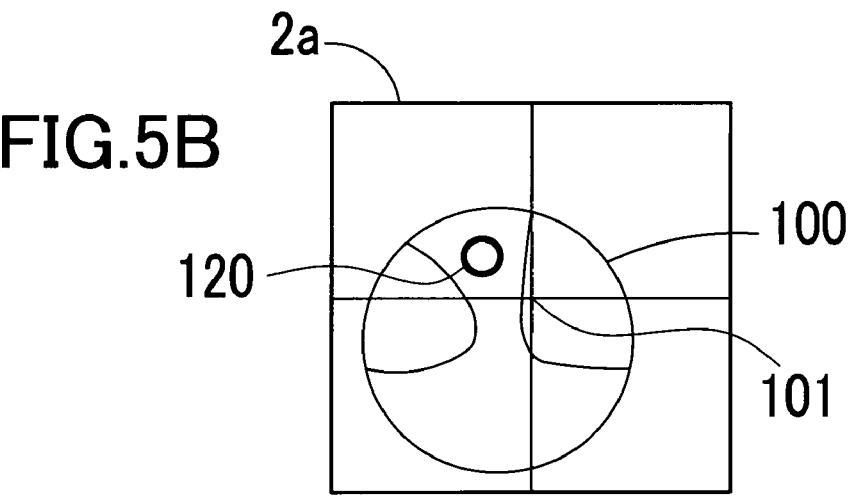
FIG. 5B is a diagram showing a display screen for alignment to bring the near vision portion of the progressive lens into the measurement region.

FIG. 5B is a display example of a case where, during alignment of the near vision portion, the measurement region is deviated from the progressive portion in the right direction. In this case, the lens LE is moved rightward. On the presumption that an optical distortion amount is an absolute value of a difference between the previously stored cylinder power C of the far vision portion and the currently measured cylinder power C, the deviation in the lateral direction is determined based on a difference (variation) between the optical distortion amounts detected in measurement positions on both sides of the optical axis L1 in the lateral direction.

While the lens LE is moved so that the center of the mark 120 approaches the mark 101, it is determined that the near vision portion is present in the measurement region if the additional power or the equivalent spherical power detected in at least three measurement positions on both sides of the optical axis L1 in the vertical direction meets a predetermined permissible condition and the optical distortion amount detected in at least three measurement positions on both sides of the optical axis L1 in the lateral direction meets a predetermined permissible condition.

Figure 5C:
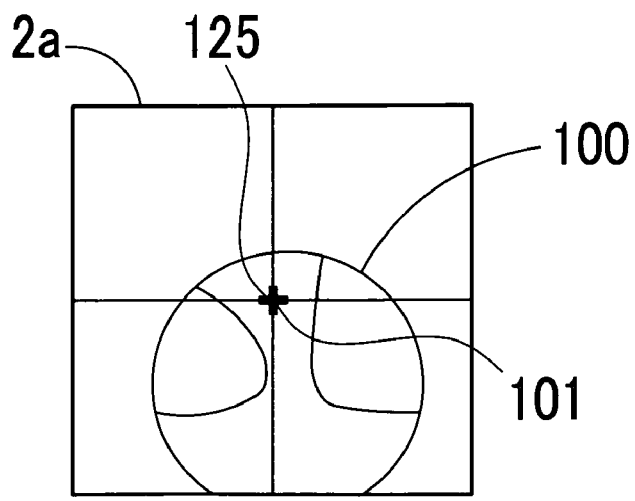
FIG. 5C is a diagram showing a display screen for alignment to bring the near vision portion of the progressive lens into the measurement region.

When the near vision portion is determined to be present in the measurement region, the arithmetic control part 40 displays a bold cross mark 125, instead of the mark 120, in an overlapping manner with the intersection of the mark 101 as shown in FIG. 5C. This informs of completion of the alignment of the near vision portion. A measured value of the near vision portion is stored in the memory 42 at the press of the switch 8 or automatically. When the measured value of the near vision portion is obtained, a difference between the spherical power of the far vision portion and the spherical power of the near vision portion is displayed as the additional power in a measurement result section.

In this state, the lens processed to be adapted for a normal spectacle frame which is wide to a certain degree in vertical width still has the near vision portion of about 5 to 7 mm. It is therefore possible to automatically determine that the near vision portion is in the measurement region under the foregoing determination condition. However, as for the so-called "half-eye lens" narrow in vertical width which has been processed to be adapted for a so-called "half-eye frame" narrow in vertical width, the near vision portion is apt to be lacking. Thus, it is difficult to automatically determine that the near vision portion is in the measurement region. As for such a lens as to be lack of the near vision portion, during alignment to the near vision portion, the rim of the frame is likely to be laid across the opening 4a of the nosepiece 4 due to a guiding indication. The conventional apparatus judges this case as a "measurement error". However, it may be disadvantageous that no measured value of the near vision portion is obtained. The present apparatus is therefore adapted to perform the following processing without deciding the "measurement error".

Figure 6:
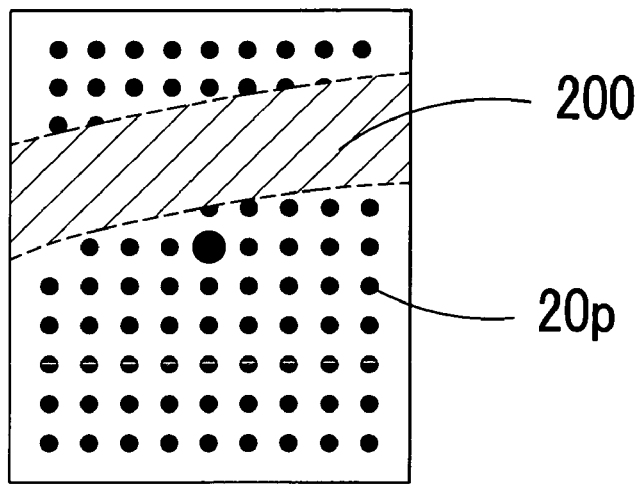
FIG. 6 is a diagram showing an example that images of the targets detected by a light receiving sensor, the images being missing because a rim of a spectacle frame is laid across an opening of a nosepiece.

When the rim of the frame is laid across the opening 4a, the measurement light beam is blocked by an area covered by the rim. Thus, some target images detected by the light receiving sensor 15 are missing as shown in FIG. 6. In the case of the arrangement pattern of the targets 20 of the target plate 14 in the present embodiment, the target images of several lateral rows could not be detected due to light blocking by the rim. FIG. 6 is an example of an imaged state of the images 20P of the targets 20 on the light receiving sensor 15, in which a shaded portion 200 represents a light blocked area. The target images 20P in this area cannot be detected. When the target images 20P of the several lateral rows are undetectable, it shows that the measurement light beam is blocked by the rim. Therefore, it is detected that the non-optical region such as the rim in addition to the optical region of the lens LE is present in the measurement region.

Figure 7:
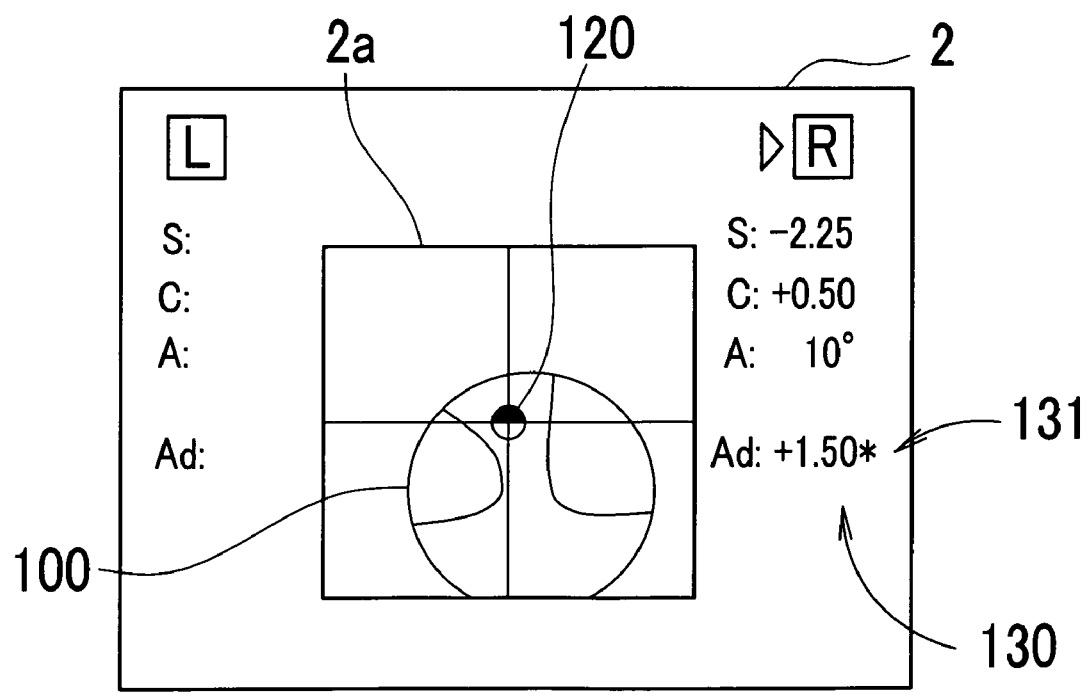
FIG. 7 is a diagram showing a display screen appearing when presence of both an optical region and a non-optical region of a lens in a measurement region is detected.

When the near vision portion is not detected and presence of the non-optical region in the measurement region is detected, the arithmetic control part 40 causes the display 2 to display to that effect. For example, a predetermined mark or the like such as the mark 120 whose upper half is colored in black as shown in FIG. 7 is displayed.

At this point, at the press of the switch 8 or automatically, the arithmetic control part 40 determines the optical characteristic distribution based on the target images detected in the optical region within the measurement region (the target images on the side of an upper part of the spectacles relative to the shaded area 200 in FIG. 6), and then stores it as a measured value of the near vision portion in the memory 42. The arithmetic control part 40 continuously obtains the optical characteristic distribution within the measurement region based on outputs of the light receiving sensor 15 at predetermined time intervals. Accordingly, in the case where there is no measurable optical region when the presence of the non-optical region of the lens LE in the measurement region is detected, a last measured value of the values having been obtained until then may be set as the measured value of the near vision portion.

The measured value of additional power (Ad) is displayed in a measured value indicating section 130. In the case where the near vision portion could not be determined (detected) (which is a state where the non-optical region is present in the measurement region), the measured value is displayed with an identifying mark 131 such as "*" for distinction from the case where the near vision portion could be determined (detected).

The spectacle frame may include a half rim frame (Nylor frame, etc.) and a rimless frame (Two point frame, etc.) as well as a full rim frame. In the case of the half rim frame, its lower edge will block the measurement light beam and thus some target images detected by the light receiving sensor 15 are missing in several lateral rows. Further, in the case of the rimless frame, a lower edge of the lens is generally chamfered, which is likely to block the measurement light beam. Thus, some target images detected by the light receiving sensor 15 are missing in several lateral rows. Consequently, the presence of the non-optical region of the lens in the measurement region can be detected.

Layout of the near vision portion in the progressive lens is different from lens to lens. As for the "half-eye lens" narrow in vertical width, it is anticipated that the near vision portion is lacking. Accordingly, some progressive lenses are processed to have higher additional power than necessary additional power so that a portion of the lens around its lower edge has the necessary additional power. In the case where the necessary additional power is +2.0 D, for example, a progressive lens of +2.5 D additional power is processed into the "half-eye lens" so that a portion of the lens around its lower edge has additional power of +2.0 D. Such a method adopting the additional power of the portion of the lens around its lower edge as a measured value is also practical.

In the case where the non-optical region such as the rim is detected within the measurement region in addition to the optical region of the lens even though presence of the near vision portion in the measurement region is not determined, the lens meter in the present embodiment can also detect an optical distance (degree of approach) of a measurement position relative to the near vision portion and, based on the distance, obtain a predicted value of the additional power of the progressive lens whose near vision portion is lacking. The optical distance of the measurement position from the near vision portion can be detected by calculating a gradient (difference) ΔS per unit distance based on a difference between a maximum value and a minimum value of the additional power detected in the measurement positions arranged in the vertical direction on the side of the upper part of the lens relative to the spectacle frame. Specifically, if ΔS is smaller (however, a value not satisfying the foregoing determination condition for the near vision portion) than a predetermined value S1 (the predetermined value S1 is determined in advance based on measurement results of various progressive lenses), the arithmetic control part 40 determines that the measurement position is almost close to the near vision portion. In this case, the obtained maximum value of additional power is directly set as the predicted value of additional power. If ΔS is larger than the predetermined value S1, the measurement position is determined to be slightly far from the near vision portion and the obtained maximum value of additional power plus 0.12 D is set as the predicted value of additional power. If ΔS is more larger, the obtained maximum value of additional power plus 0.25 D is set as the predicted value of additional power. In general, a power step of a spectacle lens is 0.25 D (or half thereof), and thus the predicted value may be obtained based on this power step. In the case where the predicted value of additional power is displayed in the measured value indicating section 130, it is accompanied with the identifying mark such as "*" for distinction from the case where the near vision portion could be determined (detected).

The above explanation is made on the measurement of the near vision portion and also may be applied to the measurement of the far vision portion. Specifically, some progressive lenses are designed to have the additional power that continuously changes even in the far vision portion. In this case, it is not determined that the far vision portion is in the measurement region even when the lens is moved. As a result, in addition to the optical region of the lens, the non-optical region such as the rim may be regarded as being present in the measurement region. As with the above case, when the presence of the far vision portion in the measurement region is not determined and the presence of the non-optical region in the measurement region is detected, a predetermined mark or the like composed of the mark 110 whose lower half is colored in black is displayed. Further, a measured value is stored in the memory 42 at the press of the switch 8 or automatically. At that time, a measured value of far power (S) is also displayed with the identifying mark 131 such as "*" in the measured value indicating section 130.

The above embodiment is made on the lens meter including the measurement optical system for obtaining the optical characteristic distribution in the measurement region of the lens corresponding to the opening 4a of the nosepiece 4. As an alternative, the present invention can also be applied to a lens meter including a measurement optical system for obtaining at the same time the optical characteristic distribution in a wider measurement region (including the far vision portion and the near vision portion) of the lens than the opening 4a.

The invention claimed is:

1. A lens meter for measuring optical characteristics of a lens to be measured, comprising:
   a measurement optical system including a light source which projects a measurement light beam to the lens, a target plate having a number of measurement targets, and a light receiving sensor which detects images of the targets formed by the measurement light beam having passed through the lens and the target plate;
   an arithmetic part which obtains optical characteristic distribution of a predetermined measurement region of the lens based on a detection signal of the light receiving sensor;
   a display;
   a control part that controls the display; and
   a mode switching means that switches a measurement mode to a measurement mode for a progressive multifocal lens having a near vision portion and a progressive portion, the progressive multifocal lens measurement mode including graphically displaying the near vision portion and the progressive portion and the measurement region on the display so that the near vision portion is brought into the measurement region;
   the arithmetic part being adapted to determine whether or not the near vision portion is in the measurement region based on whether or not a distribution of spherical power or a distribution of additional power in a vertical direction in the measurement region and a distribution of distortion amount in a lateral direction in the measurement region satisfy respective predetermined conditions, and determine whether or not a spectacle frame or an edge of the lens is detected based on the detection signal of the light receiving sensor without satisfying a determination condition for the near vision part.

2. The lens meter according to claim 1, wherein when the arithmetic part determines that the spectacle frame or the edge of the lens is detected based on the detection result of the light receiving sensor without satisfying the determination condition for the near vision portion, the control part causes the display to display a determination result of the arithmetic part.

3. The lens meter according to claim 1, wherein when the arithmetic part determines that the spectacle frame or the edge of the lens is detected based on the detection result of the light receiving sensor without satisfying the determination condition for the near vision portion, the arithmetic part obtains power in a position close to a lower end of the lens as the additional power.

4. The lens meter according to claim 1, wherein when the arithmetic part determines that the spectacle frame or the edge of the lens is detected based on the detection result of the light receiving sensor without satisfying the determination condition for the near vision portion, the arithmetic part estimates the additional power of the lens before edging based on a gradient of the additional power per unit distance.

* * * * *